(12) United States Patent
Martino et al.

(10) Patent No.: US 10,141,686 B2
(45) Date of Patent: Nov. 27, 2018

(54) GROMMET FOR A CABLE CONNECTOR AND A STRAIN RELIEF CABLE FITTING HAVING AN INSERT

(71) Applicant: IPEX TECHNOLOGIES INC., Oakville (CA)

(72) Inventors: Filippo Martino, Oakville (CA); Jeffrey Vincent Littlefield, Mississauga (CA)

(73) Assignee: IPEX TECHNOLOGIES, INC., Oakville (CA)

( * ) Notice: Subject to any disclaimer, the term of this patent is extended or adjusted under 35 U.S.C. 154(b) by 0 days.

(21) Appl. No.: 15/459,105

(22) Filed: Mar. 15, 2017

(65) Prior Publication Data
US 2017/0288337 A1  Oct. 5, 2017

(30) Foreign Application Priority Data

Mar. 29, 2016  (CA) ..................................... 2925184
Nov. 25, 2016  (CA) ..................................... 2949715

(51) Int. Cl.
| | |
|---|---|
| H01R 13/52 | (2006.01) |
| H01R 13/58 | (2006.01) |
| H01R 13/59 | (2006.01) |
| B60R 16/02 | (2006.01) |
| H01B 17/58 | (2006.01) |

(Continued)

(52) U.S. Cl.
CPC ......... *H01R 13/5845* (2013.01); *H01R 13/59* (2013.01); *B60R 16/0222* (2013.01); *H01B 17/583* (2013.01); *H01R 13/521* (2013.01); *H01R 13/5202* (2013.01); *H01R 13/5205* (2013.01); *H01R 13/5219* (2013.01); *H01R 13/5221* (2013.01); *H01R 33/965* (2013.01); *H02G 3/0675* (2013.01); *H02G 15/007* (2013.01)

(58) Field of Classification Search
CPC .............. B60R 16/0222; H01B 17/583; H02G 15/007; H02G 3/0675; H01R 13/5202; H01R 13/5205; H01R 13/5219; H01R 33/965; H01R 13/5221; H01R 13/521
USPC .............. 174/653, 153 G; 439/271, 273, 274
See application file for complete search history.

(56) References Cited

U.S. PATENT DOCUMENTS

| | | | |
|---|---|---|---|
| 3,062,475 A | 4/1960 | Miller, Jr. | |
| 4,030,741 A * | 6/1977 | Fidrych | F16L 5/00 174/653 |

(Continued)

*Primary Examiner* — Abdullah Riyami
*Assistant Examiner* — Justin Kratt

(57) ABSTRACT

A grommet for use in a cable fitting includes a body having a bore substantially therethrough and a resilient membrane located within the bore. The resilient membrane has a thinner membrane portion extending radially towards the bore to provide a controlled tear during cable insertion. The body has an exit opening which comprises resilient gripping teeth projecting axially from the body with an axially extending resilient foldable membrane located between at least two adjacent resilient teeth and foldable therebetween when they are radially compressed. Once force is applied by the axial movement of the fitting assembly onto a tapered surface of the grommet, the flexible gripping members radially collapse towards an inserted cable. The grommet may be assembled in a strain relief connector having a nut, a connector body and optionally an insert.

22 Claims, 16 Drawing Sheets

(51) Int. Cl.
    *H02G 15/007*     (2006.01)
    *H02G 3/06*       (2006.01)
    *H01R 33/965*     (2006.01)

(56) References Cited

U.S. PATENT DOCUMENTS

| | | |
|---|---|---|
| 4,390,142 A | 6/1983 | Cheng |
| 4,510,798 A | 4/1985 | Prussin et al. |
| 5,873,540 A | 2/1999 | Hardin |
| 6,234,418 B1 | 5/2001 | Donaldson |
| 6,966,791 B1 | 11/2005 | Farr |
| 7,077,693 B1 | 7/2006 | Symons |
| D539,117 S | 3/2007 | Sealey |
| D542,123 S | 5/2007 | Symons |
| D554,017 S | 10/2007 | Hampton |
| 7,399,199 B2 | 7/2008 | Symons |
| D591,678 S | 5/2009 | Whitley |
| D598,480 S | 8/2009 | Kanemitsu |
| 7,654,484 B2 | 2/2010 | Mogensen |
| 7,686,830 B2 | 3/2010 | Collier |
| D631,730 S | 2/2011 | Skillman |
| D644,306 S | 8/2011 | Douglass, III |
| D645,334 S | 9/2011 | Kanemitsu |
| D685,771 S | 7/2013 | Bertenthal |
| 8,474,105 B2 | 7/2013 | Naquin |
| D716,640 S | 11/2014 | Martinson |
| D722,621 S | 2/2015 | Gray |
| D735,020 S | 7/2015 | Bradford |
| 9,187,291 B2 | 11/2015 | Alexandre |
| D748,455 S | 2/2016 | Symons |
| 2002/0145073 A1 | 10/2002 | Swanson |
| 2003/0122023 A1 | 7/2003 | Pitcher |
| 2004/0178398 A1 | 9/2004 | Miller |
| 2011/0036676 A1 | 2/2011 | Skillman |
| 2011/0198110 A1* | 8/2011 | Fujita ............... B60R 16/0222 174/153 G |
| 2015/0200530 A1* | 7/2015 | Chiu ............... H02G 15/007 174/653 |

* cited by examiner

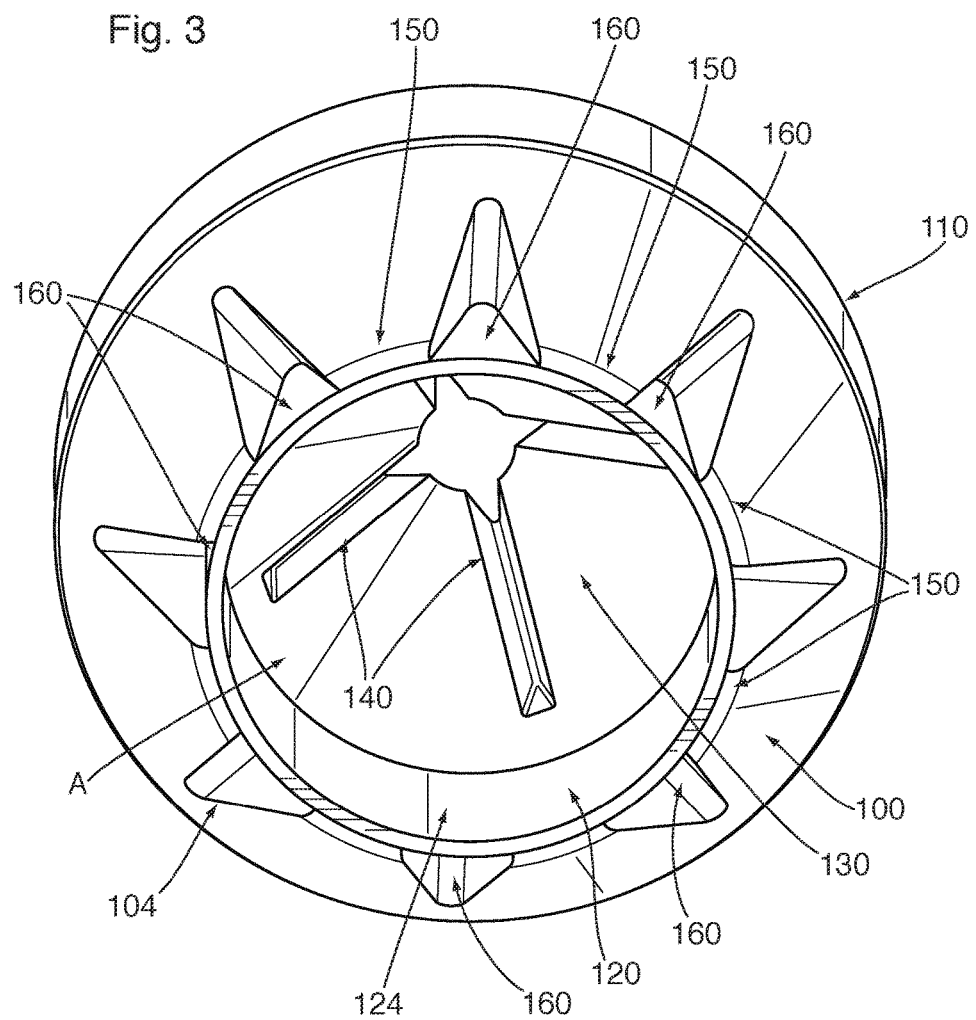

US 10,141,686 B2

GROMMET FOR A CABLE CONNECTOR AND A STRAIN RELIEF CABLE FITTING HAVING AN INSERT

FIELD OF THE INVENTION

The present invention relates to cable connectors for receiving a cable. In particular, the invention relates to a strain relief cable connector and a grommet for use therein, and in some cases with an insert.

BACKGROUND OF THE INVENTION

Cable connectors or fittings have been used for a number of years to terminate and connect a variety of cables, such as electrical power cables, communication signal cables, and other types of power or communication cables. Such connectors may include a strain relief element for securing the cables to the connectors or fittings. Such strain relief elements may comprise a number of components, including grommets, which in their simplest form comprise a rubber or plastic member designed to line a hole to prevent or reduce the likelihood of a cable or pipe passing therethrough from chafing or bending of the cable. Grommets may also resist, or reduce the possibility of the cable being pulled out of the electrical connector or fitting.

SUMMARY OF THE INVENTION

Accordingly, it is an object of this invention to at least partially overcome some of the disadvantages of the prior art. Also, it is an object of this invention to provide an improved type of grommet for use in a cable connector or fitting and an improved cable connector fitting comprising such grommets.

Accordingly, in one of its aspects, this invention resides in a grommet for use in a cable fitting, said grommet comprising: a body having a bore substantially therethrough, said bore having a cable opening for receiving a cable to be inserted and an exit opening for the cable to exit from the body; a resilient membrane located within the bore, said resilient membrane elastically deformable from a receiving position, before the cable is inserted into the bore, to an inverted position, after the cable is inserted into the bore.

In a further aspect, the present invention resides in a cable connector comprising: a connector nut having an internal engagement surface; a connector body axially movable relative to the connector nut and having an angled engagement surface; a grommet contained within the connector nut and the connector body, said grommet having a bore substantially therethrough, said bore having a cable opening for receiving a cable at a receiving end and an exit opening for the cable to exit at an exiting end, and, a resilient membrane located within the bore, said resilient membrane elastically deformable from a receiving position, before the cable is inserted into the bore, to an inverted position, after the cable is inserted into the bore; and wherein axially moving the connector nut towards the connector body causes the internal engagement surface and the angled engagement surface to apply axial and radial pressure in the grommet.

In a further preferred embodiment, the cable connector may also comprise an insert. A removed radial section may be located longitudinally coincident with a relief notch to facilitate relative movement of a first part of the insert with respect to a second part of the insert permitting a gripping member to grip the cable, increasing the frictional forces. The insert may have a radially extending portion which has a connector nut engagement surface. Axially moving the connector nut towards the connector body causes the internal engagement surface of the connector nut to apply axial and radial pressure to the insert causing relative movement of the first part towards the second part of the insert, permitting the gripping member to grip the cable and increase frictional forces.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention:

FIG. 3 is a bottom perspective view of a grommet according to one embodiment of the present invention.

DETAILED DESCRIPTION OF THE PREFERRED EMBODIMENTS

Preferred embodiments of the invention and its advantages can be understood by referring to the present drawings.

In the present drawings, like numerals are used for like and corresponding parts of the accompanying drawings. Also, the following preferred embodiments and detailed description illustrate and describe non-limiting features of the invention.

One or more of the preferred embodiments described herein relates to a grommet and/or a cable connector or fitting (sometimes referred to as strain relief fitting) for terminating or receiving cables, such as electrical and communication cables. More specifically, the described cable connectors may include a grommet having a central bore therethrough for receiving a cable. Consistent with the preferred embodiments described herein, the grommet may include a resilient membrane located within the bore and elastically deformable from a receiving position, before the cable is inserted into the bore, to an inserted or inverted position, after the cable has been inserted into the bore, which is in an inverted orientation with respect to the receiving position, to create a better sealing interface and/or friction fit between the grommet and the cable being inserted. A comparatively thinner membrane portion in the resilient membrane allows controlled tearing of the resilient membrane as the cable is first inserted to improve ease of electrical wire installation. Furthermore, the grommet may comprise axially projecting resilient gripping members (sometimes referred to as teeth) separated by intermediate resilient foldable membranes which fold about or between the resilient gripping members when the resilient teeth are radially compressed about the cable to improve the friction fit and/or sealing interface between the grommet and the cable. Additionally, the grommet may be used in a fitting or connector assembly having a connector nut mating with a connector body which, when axially placed together, resiliently deform the flexible gripping members of the grommet towards the cable causing the intermediate membranes to fold therebetween, thereby gripping the cable more securely. At least a portion of the resilient membrane within the bore in the inserted or inverted position is preferably axially coincident with at least one axially projecting resilient gripping member, such that the resilient membrane is between the cable and at least a portion of gripping members. Thus, the resilient membrane, gripping members and/or foldable membrane co-operate to prevent or reduce the likelihood that the cable maybe pulled-out of the electrical connector fitting and also decreasing the likelihood of the cable chafing or bending.

Figure 1:
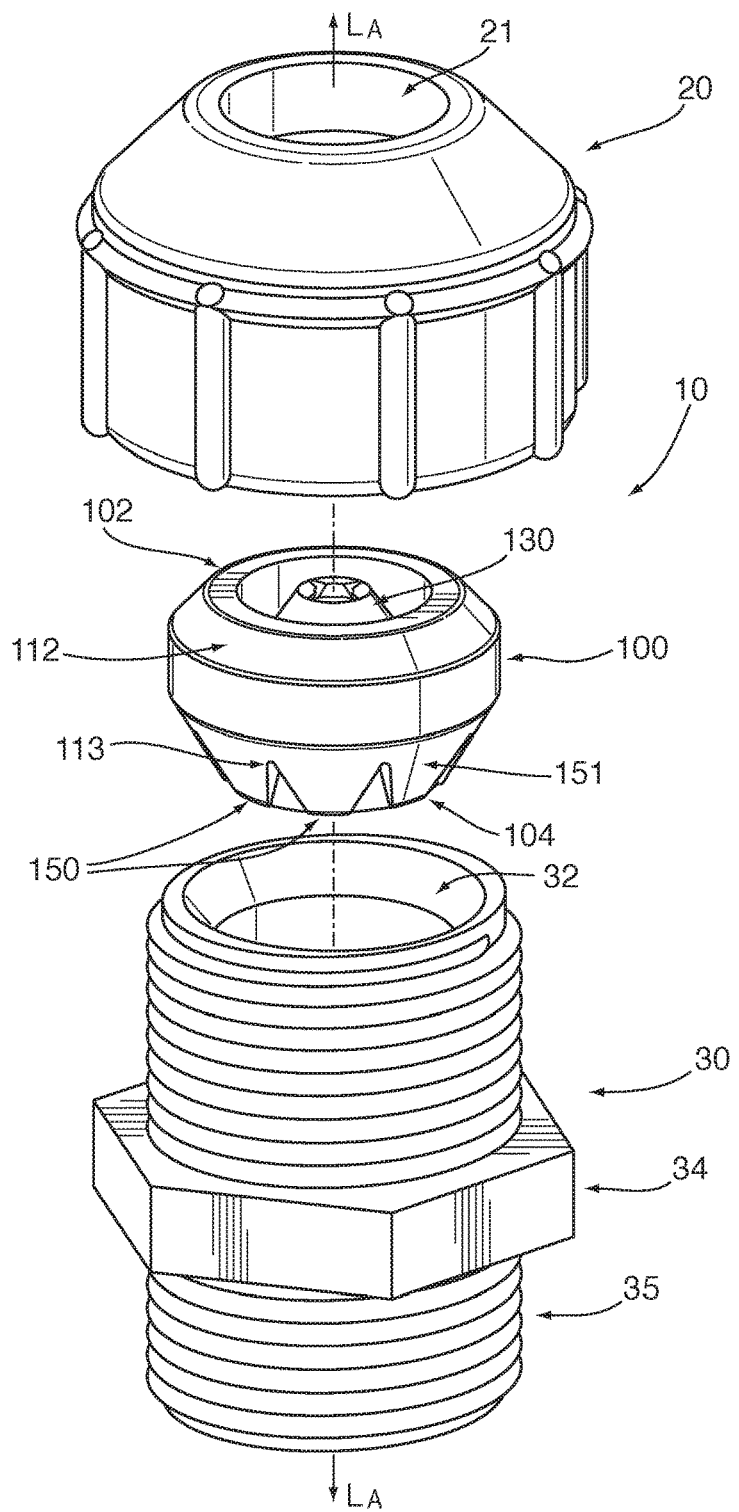
FIG. 1 is an exploded view of the cable fitting comprising a grommet according to one embodiment of the present invention.
Figure 2A:
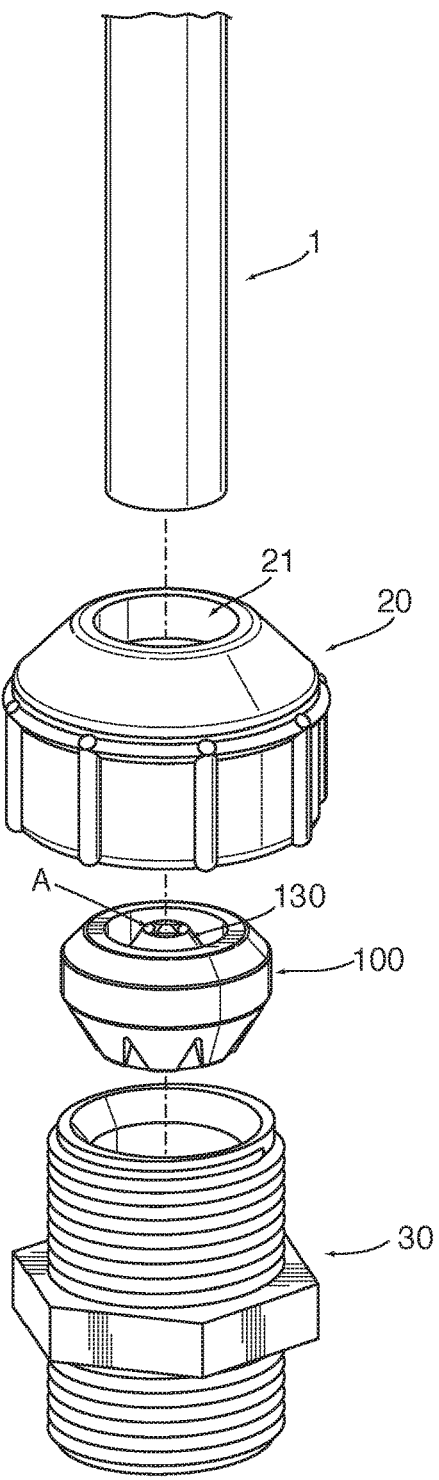
FIG. 2A is an exploded view of the cable connector with the cable being inserted according to one embodiment of the present invention.
Figure 2B:
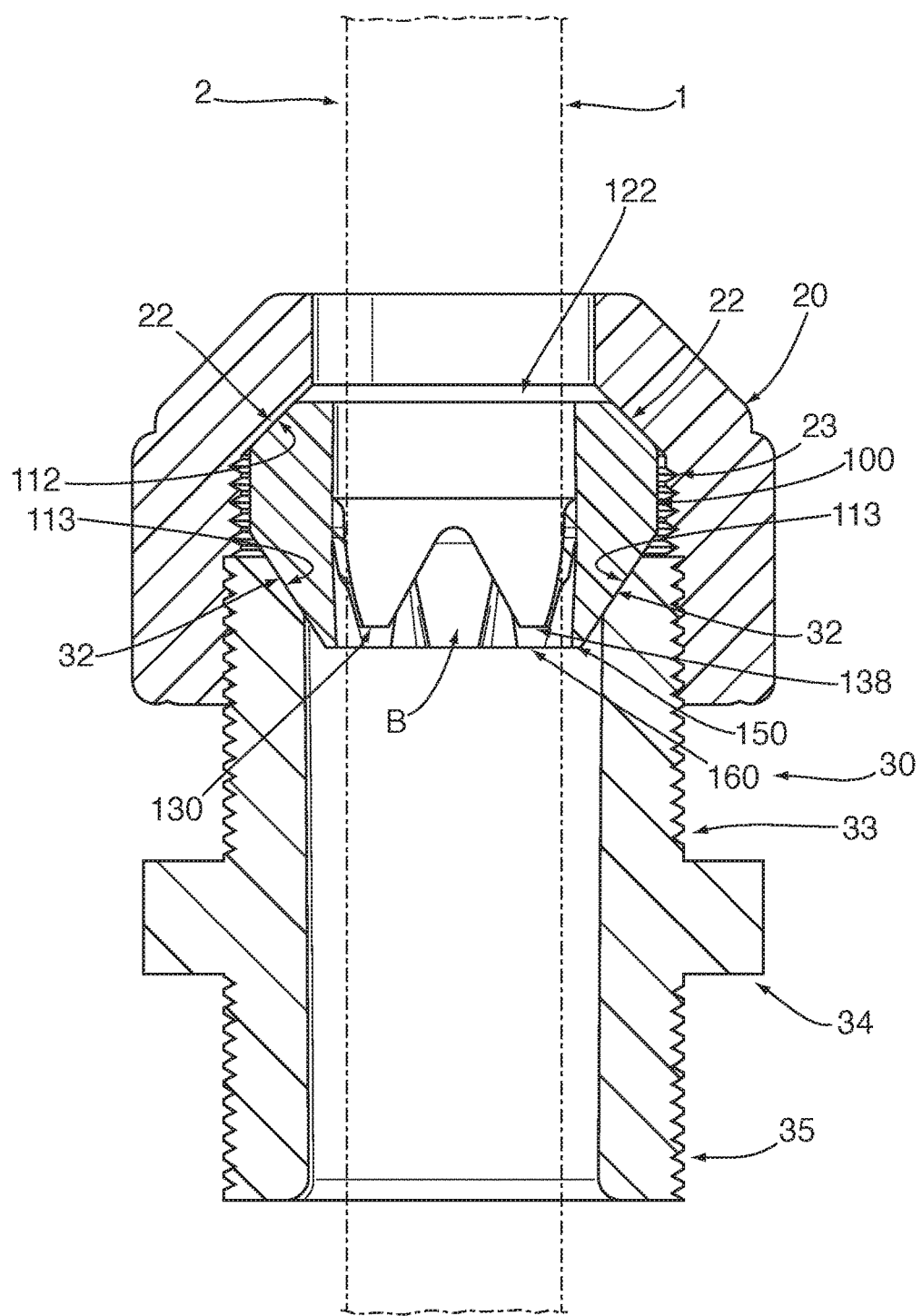
FIG. 2B is a cross-sectional view of the cable connector with the cable inserted therein according to one embodiment of the present invention.

As shown in FIG. 1, one embodiment of the present invention relates to a cable connector or fitting, shown generally by reference numeral 10, in an exploded configuration. As shown in FIG. 1, the connector 10 comprises a connector nut 20 which mates with a connector body 30 and a grommet 100 located intermediate the connector nut 20 and connector body 30. FIG. 2A shows an exploded view of the connector 10 with a cable 1 being inserted into the cable connector 10. As illustrated in FIG. 2A, the cable 1 enters the orifice 21 of the connector nut 20. FIG. 2B shows a cross-sectional side view of the cable connector 10 with a cable 1 inserted therein. FIGS. 3, 4, 5 and 6 show a bottom perspective view, a top perspective view, a side view and a cross-sectional view, respectively, of the grommet 100 according to one embodiment of the invention. FIG. 7 shows a bottom perspective view of the grommet 100, similar to FIG. 3, but with the grommet 100 axially compressed and with a cable (not shown) inserted therein.

In one implementation, the connector 10 is initially assembled by connecting the connector nut 20 to the connector body 30 with the grommet 100 in between the connector nut 20 and the connector body 30. As illustrated in FIG. 2B, in one preferred embodiment, the connector nut 20 has internal threads 23 which mate with external threads 33 of the connector body 30 to connect the connector nut 20 to the connector body 30. Thus, in one embodiment, rotation of the connector nut 20 with respect to the connector body 30 about the longitudinal axis $L_A$ causes relative axial movement of the connector nut 20 and the connector body 30 along the longitudinal axis $L_A$ to compress the grommet 100 in a manner as more fully described below.

As illustrated in FIGS. 3, 4, 5 and 6, the grommet 100, according to one preferred embodiment of the present invention, comprises a body, illustrated generally by reference numeral 110, having a bore 120 substantially therethrough. The bore 120 has a cable opening 122 illustrated best in FIG. 4 which is a top perspective view of the grommet 100. The cable opening 122 receives a cable 1 to be inserted into the connector 10 and also the grommet 100, as illustrated for instance in FIGS. 2A and 2B. The grommet body 110 also comprises an exit opening 124, illustrated best in FIG. 3, which is the bottom perspective view of the grommet 100. The cable 1 which is received by the cable opening 122 into the grommet 100 exits from the grommet body 110 through the exit opening 124.

The grommet 100 further comprises a membrane 130 located within the bore 120. The resilient membrane 130 is illustrated in each of FIGS. 3, 4, 6 and 7, as well as FIGS. 1, 2A and 2B. The resilient membrane 130 is elastically deformable from a receiving position A, before the cable 1 is inserted into the bore 120, to an inserted or inverted position B, after the cable 1 has been inserted into the bore 120. This is illustrated for instance by a comparison of FIGS. 2A and 2B. In FIG. 2A, the resilient membrane 130 is in the receiving position A. This is also the case in each of FIGS. 3, 4 and 6. In FIG. 2B, the cable 1 has been inserted into the connector 10 which includes the grommet 100, and the resilient membrane 130 is now in the inserted or inverted position B. FIG. 7 also shows the resilient membrane 130 in the inverted position B, but the cable 1 is not shown in FIG. 7 for ease of illustration.

Figure 4:
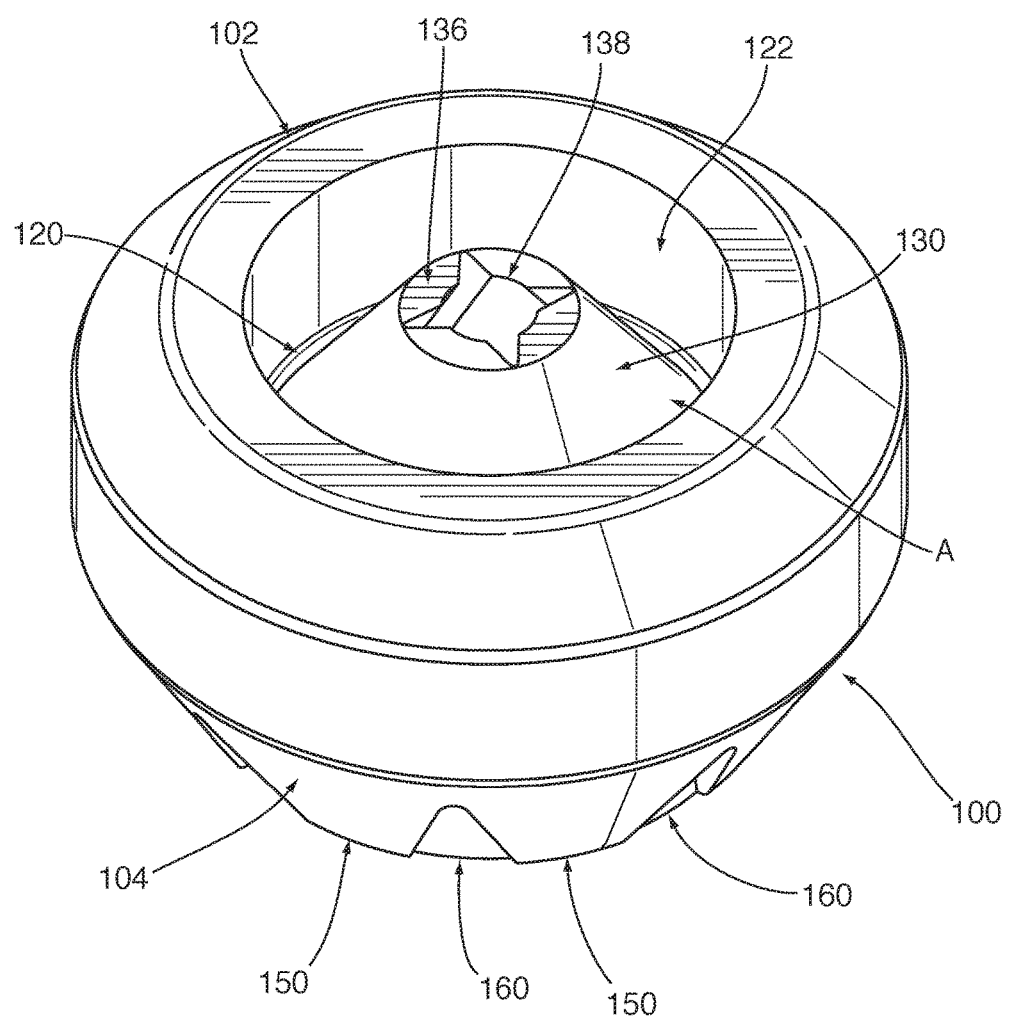
FIG. 4 is top perspective view of a grommet according to one embodiment of the present invention.
Figure 5:
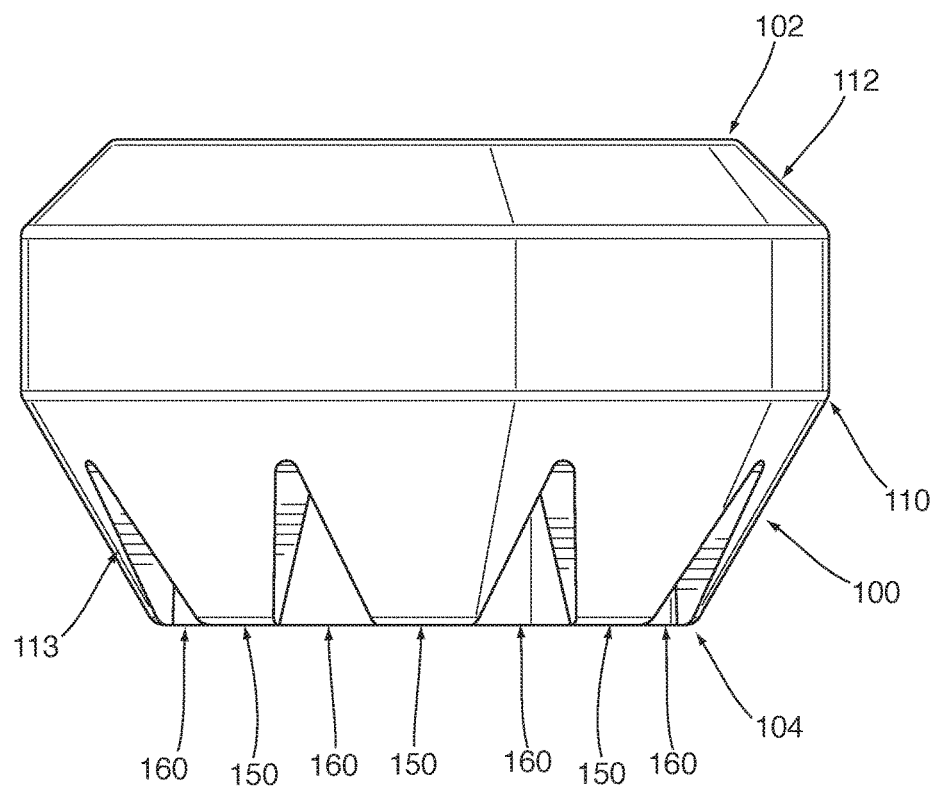
FIG. 5 is a side view of the grommet shown in FIGS. 3 and 4 according to one embodiment of the present invention.

As illustrated at least in FIGS. 2A and 4, in the receiving position A, the resilient membrane 130 extends axially forward towards the cable opening 122. Once the cable 1 has been inserted, as illustrated in FIGS. 2B and 7 for example, the resilient membrane 130 is elastically deformed to the inverted position B. In the inverted position B, the resilient membrane 130 extends axially away from the cable opening 122. It is understood that in the inverted position B, the resilient membrane 130 has an inverted orientation as compared to the receiving position A.

Figure 6:
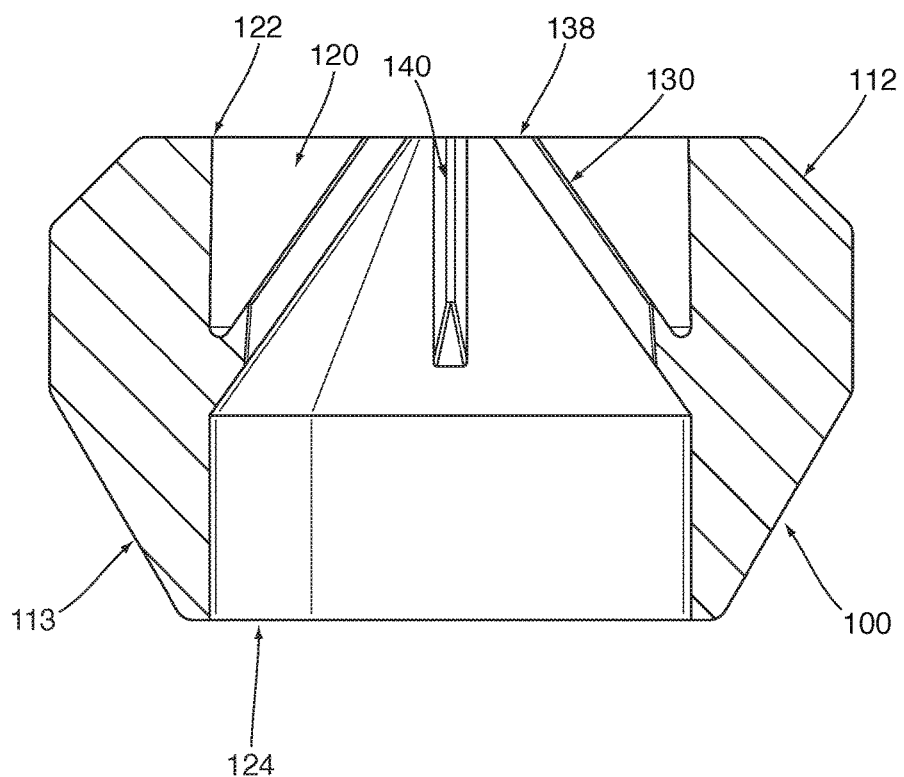
FIG. 6 is a radial cross-sectional view of the grommet shown in FIGS. 3 and 4 according to one embodiment of the present invention.
Figure 7:
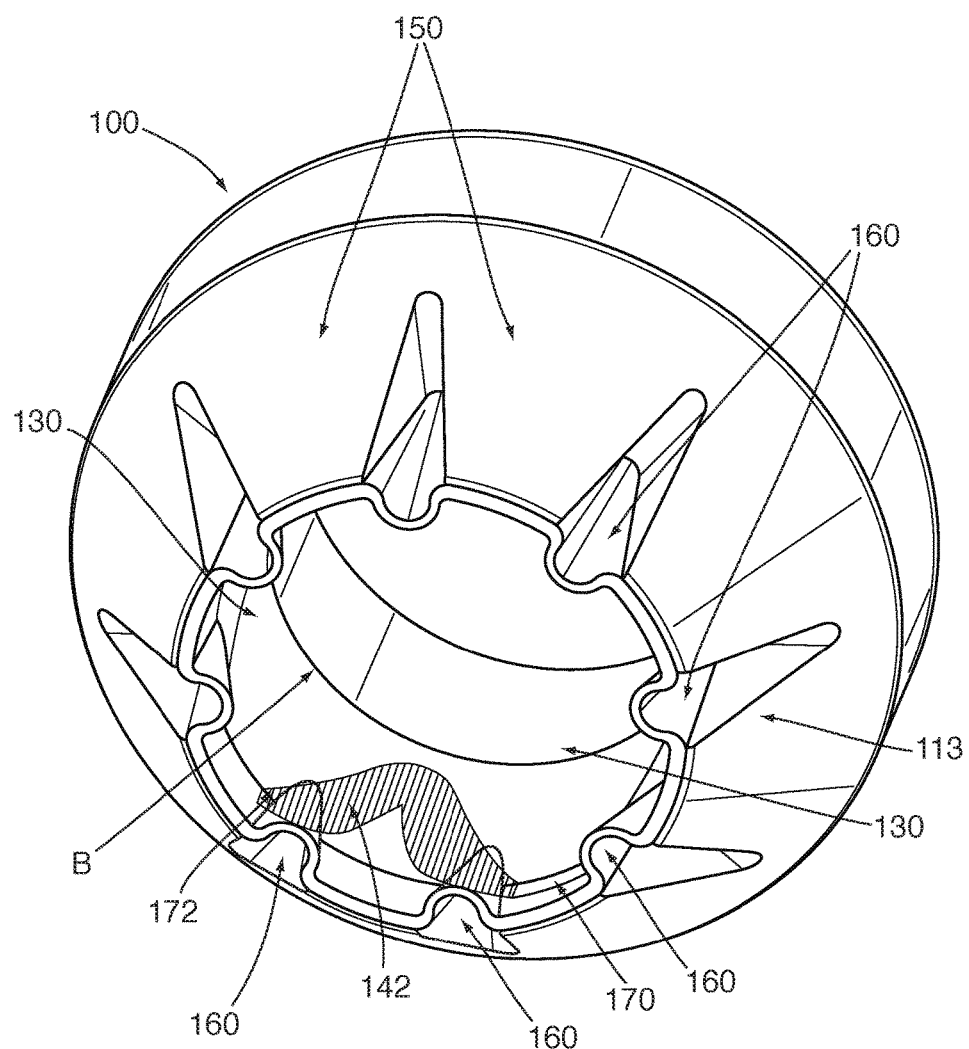
FIG. 7 is a bottom perspective view of the grommet shown in FIG. 3 while being compressed and the resilient membrane in the inverted position.

As also illustrated in FIGS. 3, 4 and 6, in one preferred embodiment, in the receiving position A, the resilient membrane 130 has a substantially conical shape 136. As also illustrated best in FIG. 4, the resilient membrane 130 having a substantially conical shape 136 also has an apex, as shown generally by reference numeral 138, extending forward towards the cable opening 122. In the inverted position B, after the cable 1 has been inserted, the apex 138 has been elastically deformed towards the exit opening 124, as illustrated in FIG. 2B. As also illustrated in FIG. 2B, the resilient membrane 130 no longer has a substantially conical shape 136, but rather is resiliently and elastically deformed by the cable 1 to the inverted position B so as to create a better frictional fit with the surface 2 of the cable 1.

In a preferred embodiment, as illustrated for instance in FIG. 4, in the receiving position A, the resilient membrane 130 extends substantially across all of the bore 120. In this way, all of the bore 120, except for a small opening near the apex 138, is completely occluded by the resilient membrane 130. As also illustrated by at least FIGS. 3, 4 and 6, the resilient membrane 130 is substantially completely contained within the bore 120 and the apex 138 is substantially flush with the cable opening 122, in one preferred embodiment.

In a further preferred embodiment, the resilient membrane 130 comprises at least one thinner membrane portion 140 which extends radially toward the bore 120 to facilitate controlled tearing of the resilient membrane 130. In a preferred embodiment, where the resilient membrane 130 comprises a substantially conical shape 136 having an apex 138, the at least one thinner membrane portion 140 extends from the apex 138 towards the bore 120. The thinner membrane 140 is adapted to create a controlled tear 142 as shown for instance in FIGS. 2B and 7, as cable 1 is inserted into the bore 120 and the resilient membrane 130 elastically deforms from the receiving position A to the inverted position B. It is understood that this controlled tear 142 will generally occur the first time the cable 1 is inserted into the bore 120. If the cable 1 is later removed from the grommet 100 and reinserted, a controlled tear 142 would have been created already, however, a further tear or extension of the controlled tear 142 may occur.

The grommet 100 also preferably comprises a number of resilient gripping members, shown generally by reference numeral 150, at the exit opening 124. The resilient gripping member 150 project axially from the body 110 at or near the exit opening 124. Furthermore, the grommet 100 further comprises a number of resilient foldable membranes 160, each resilient foldable membrane 160 located between two adjacent resilient gripping members 150. Thus, the resilient foldable membranes 160 interconnect the adjacent gripping members 150. The resilient gripping members 150, when radially compressed, grip the surface 2 of the cable 1 more securely to improve the sealing interface and the friction fit between the grommet 100 and cable 1. Furthermore, the intermediate resilient foldable membranes 160 fold about or between the adjacent resilient gripping members 150 when the resilient gripping members 150 are radially compressed about the cable 1 to also improve the friction fit and/or sealing interface between the grommet 100 and the cable 1. The resilient gripping members 150 (sometimes referred to as teeth) are resiliently deformed towards the cable 1 when the connector nut 20 is mated with the connector body 30 and axially placed together as discussed more fully below.

FIG. 7 illustrates the grommet 100 in the compressed position. It is understood that this compressed position shown in FIG. 7 would generally occur inside the connector or cable fitting 10 when the grommet 100 is compressed by the nut 20 and connector body 30 as discussed more fully below. Furthermore, the resilient membrane 130 in FIG. 7 is shown in the inserted or inverted position B, however, for ease of illustration, the cable 1 is not shown in FIG. 7. As illustrated in FIG. 7, the resilient membrane 130 is intermediate the bore 120 in the position where the cable 1 (not shown in FIG. 7) would be. Also, the resilient membrane 130 is shown in the inverted position B in FIG. 7 having been elastically deformed towards the exit opening 124 such that at least a portion, shown generally by reference numeral 170, of the resilient membrane 130 is axially coincident with at least one of the number of resilient gripping members 150 and also located intermediate the at least one resilient gripping member 150 and the location of the inserted cable 1 (not shown in FIG. 7). In this way, the added presence of the portion 170 of the resilient membrane 130 axially coincident with the location of the resilient gripping members 150 when they are compressed and axially coincident with the inserted position of the cable 1 (not shown in FIG. 7) and the resilient gripping members 150 increases the friction fit of the cable 1 in the grommet 100. Similarly, the foldable membrane 160 also interacts with a portion 172 of the resilient membrane 130. In this way, the resilient membrane 130 within the bore 120 interacts with the gripping members 150 and/or the foldable membrane 160 to cooperate to improve the friction fit and prevent or reduce the likelihood that the cable 1 (not shown in FIG. 7) may be pulled out of the grommet 100 and thus the electrical connector fitting 10. Furthermore, the grommet 100 may decrease the likelihood of the cable 1 chafing or bending.

Consistent with implementations and embodiments described herein, the grommet 100 may be formed of different types of rubber or plastic or other elastomeric materials to permit resilient deformation of the resilient membrane 130, as well as the resilient gripping members 150 and the resilient foldable membrane 160. Furthermore, selection of the material of the grommet 100 may include a number of different types of semi-rigid material which have a relatively high friction coefficient and providing more secure gripping engagement between the outer surface 2 of the cable 1 and the bore 120, the resilient membrane 130, the resilient gripping members 150 and the resilient foldable membranes 160 of the grommet 100. In one preferred embodiment, resins such as thermoplastic elastomers (TPE) or thermoplastic polyurethanes (TPA) are preferably for the grommet 100 due to their high heat capabilities. The connector nut 20 and the connector body 30 may be formed of any suitable material, including conductive and non-conductive materials, such as plastics, polyvinyl chloride (PVC), nylon or other polymers, as well as metals such as copper, stainless steel or aluminum.

It is understood that the grommet 100 in one embodiment would be contained within a cable fitting, such as cable fitting 10. In operation, one or more of the preferred embodiments of the grommet 100 contained within the cable fitting 10, which also comprises a connector nut 20 and connector body 30, would operate as follows.

Referring again to FIGS. 1, 2A and 2B, the grommet 100 has a receiving end 102 comprising the cable opening 122 for receiving the cable 1 and an exiting end 104 comprising the exit opening 124 for the cable 1 to exit. The exiting end 104 also preferably comprises the resilient gripping members 150 and the resilient foldable membranes 160 located therebetween. The resilient gripping members 150 projecting axially from the grommet 100 at the exit opening 124 and comprise an external portion 151 for fittingly engaging the connector 10. In particular, the external portion 151 is preferably frusto-conically shaped and tapers rearwardly towards the exit opening 124. In this way, a tapered engagement surface 113 may be formed at the exiting end 104 of the grommet 100 as illustrated best in FIG. 2B. The tapered engagement surface 113 preferably comprises the external portion 151 of the resilient gripping members 150 to facilitate radial compression of the resilient gripping members 150 and folding of the resilient folding membranes 160 of the grommet 100.

The receiving end 102 comprises an engagement surface 112 which also is preferably frusto-conically shaped, but tapering forward towards the cable opening 122. The engagement surface 112 at the receiving end 102 fittingly engages an internal engagement surface 22 of the connector nut 20 as shown best in FIG. 2B with the engagement surface 112 fittingly engaging the internal engagement surface 22 of the connector nut 20 of the grommet as illustrated in FIG. 2B. Similarly, the tapered engagement surface 113 at the exiting end 104 fittingly engages the angled engagement surface 32 of the connector body 30 as also illustrated best in FIG. 2B. Thus, the engagement surface 112 at the receiving end 102 is preferably a forwardly tapering frusto-conical angled surface, and, the tapered engagement surface 113 at the exiting end 124 is preferably a rearwardly tapering frusto-conically angled surface which cooperate with the internal engagement surface 22 of the connector nut 20 and the angled engagement surface 32 of the connector body 30 to translate longitudinal axial $L_A$ pressure into axial and radial pressure at the receiving end 102 and the exiting end 104. In particular, by applying axial and radial pressure to the exiting end 104 along the tapered engagement surface 113 comprising the external portion 151 of the resilient gripping members 150, the gripping members 150 are radially compressed about the cable 1. Furthermore, the cable connector 10 axially and radially compresses the grommet 100 about the cable 1 when the nut 20 is relatively axially moved closer to the connector body 30. In addition, the internal engagement surface 22 of the connector nut 20 in fitting engagement with the engagement surface 112 of the receiving end 102 axially and radially compress the receiving end 102, and the bore 120 at the cable opening 122, towards the cable 1. Furthermore, it is understood that, as the tapered engagement surface 113 comprising the external portion 151 of the resilient gripping members 150, axially and radially compress the gripping members 150 towards the cable connector 10, the resilient foldable membranes 160 will also fold between the gripping members 150, which is the compressed position of the grommet 100 as shown in FIG. 7 discussed above.

As indicated above, relative axial movement of the connector nut 20 towards the connector body 30 may be caused by rotating the nut 20 with respect to the connector body 30 about the longitudinal axis $L_A$ and the engagement of the internal threads 23 of the connector nut 20 mating with the external threads 33 of the connector body 30. However, it is understood that any other manner of axially moving the connector nut 20 relative to the connector body 30 may achieve similar results of axially and radially compressing the grommet 100 about the cable 1 and cause the gripping members 150 to radially compress about the cable 1, and similarly, axially and radially compress the bore 120 at the cable opening 122 about the cable 1. For instance, the nut 20 may be axially moved towards the connector body 30 by a push-on connection (not shown), clamping, crimping, or other non-threaded means.

In operation, the assembled connector 10 as shown in FIG. 2B would initially receive the cable 1. Insertion of the cable 1 into the connector 10 would deform the resilient membrane 130 of the grommet 100 from the receiving position A to the inverted position B and also, if this is the first use, may cause a controlled tear 142 along the thinner membrane portion 140. To accommodate the cable 1, the connector nut 20 would initially generally only be loosely connected to the connector body 30, such that minimal radial and axial pressure is applied by the internal engagement surface 22 to the engagement surface 112 and minimal radial and axial pressure is applied to the tapered engagement surface 113, comprising the external portion 151 of the resilient gripping members 150, by the angled engagement surface 32 of the connector body 30. Once the cable 1 is fully inserted into the connector 10 comprising the grommet 100, and the resilient membrane 130 has been deformed from the receiving position A to the inverted position B, axially moving the connector nut 20 towards the connector body 30 will cause internal engagement surface 22 of the nut 20 to apply axial and radial pressure onto the engagement surface 112 of the receiving end 102 and the angled engagement surface 32 of the connector body 30 to apply axial and radial pressure to the tapered engagement surface 113 of the exiting end 104, causing the gripping members 150 to radially compress about the cable 1 and the cable connector 10 to axially compress about the grommet 100 and the cable 1. In this way, the connector 10 comprising the grommet 100 may provide a stain relief fitting which reduces the likelihood that the cable 1 may be pulled out of the electrical connector fitting 10 and also decreases the likelihood of the cable chafing or bending.

In an alternate operation, the cable 1 may be inserted through the connector 10 when each of the components, namely the connector nut 20, the connector body 30 and grommet 100 are in an unassembled orientation. For instance, the cable 1 may be passed through the orifice 21 of the connector nut 20, pulled through the grommet 100 and then through the connector body 30. The grommet 100 can then mate with the connector body 30 or alternatively, the connector nut 20 and the connector 10 can be finally assembled, for instance by rotating the nut 20 with respect to the connector body 30 about the longitudinal axis $L_A$ and the engagement of the internal threads 23 of the connector nut 20 with the external threads 33 of the connector body 30, in this particular embodiment. In this way, the connector 10 is assembled after the cable 1 has been passed through the connector nut 20, received by the grommet 100 and then ultimately passed through the connector body 30.

In either case, the resulting assembled connector 10 with the cable 1 fitted therein can be tightened by, in one preferred embodiment, manually rotating the nut 20 with respect to the cable connector 30. This is generally sufficient to secure the cable 1 within the grommet 100 and the connector 10. The connector 10 may also comprise a tool engagement member, shown generally by reference numeral 34, for using a tool (not shown), such as a wrench, to further tighten the connector body 30 to the connector 20, if desired. The tool engagement member 34 may also be used to connect the resulting connector fitting assembly 10, including the cable 1, to another electrical element (not shown) such as an electrical box, a wall, or other structure (not shown) such as by using the further connecting threads 35 axially separated from the external threads 33 by the tool engagement member 34.

Figure 8:
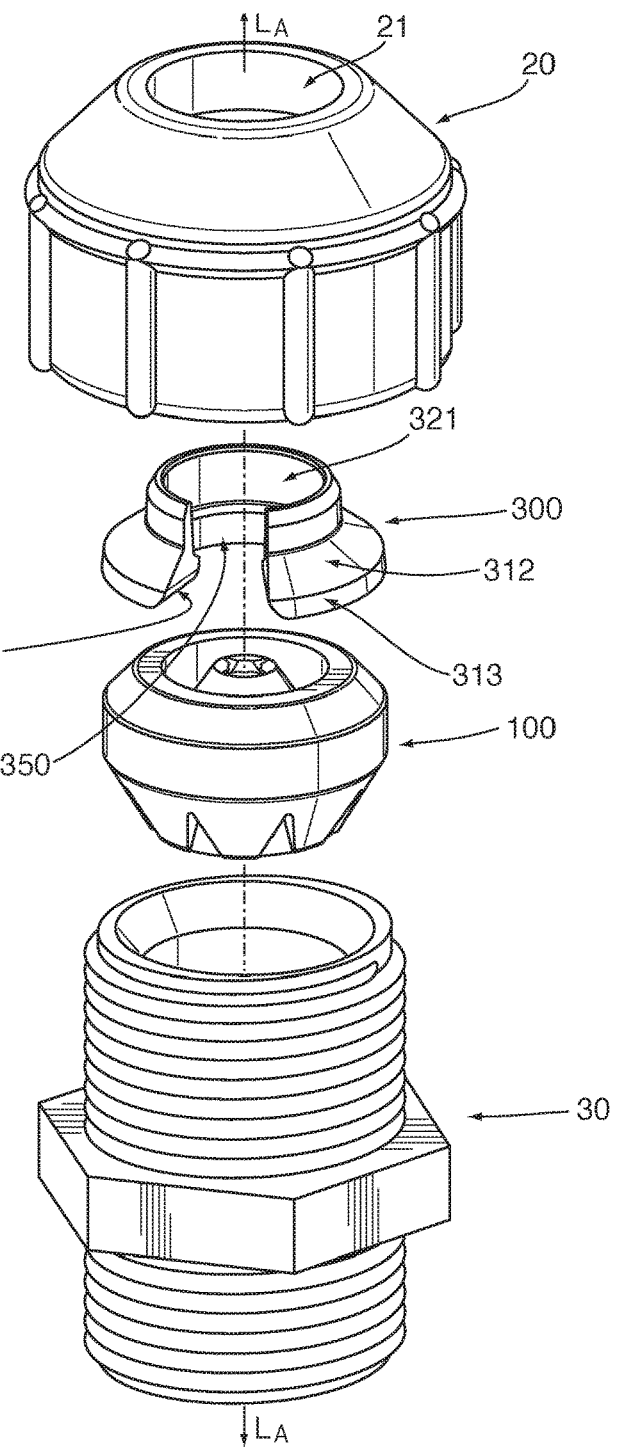
FIG. 8 is an exploded view of a cable fitting comprising a grommet and an insert according to a further embodiment of the present invention.
Figure 9:
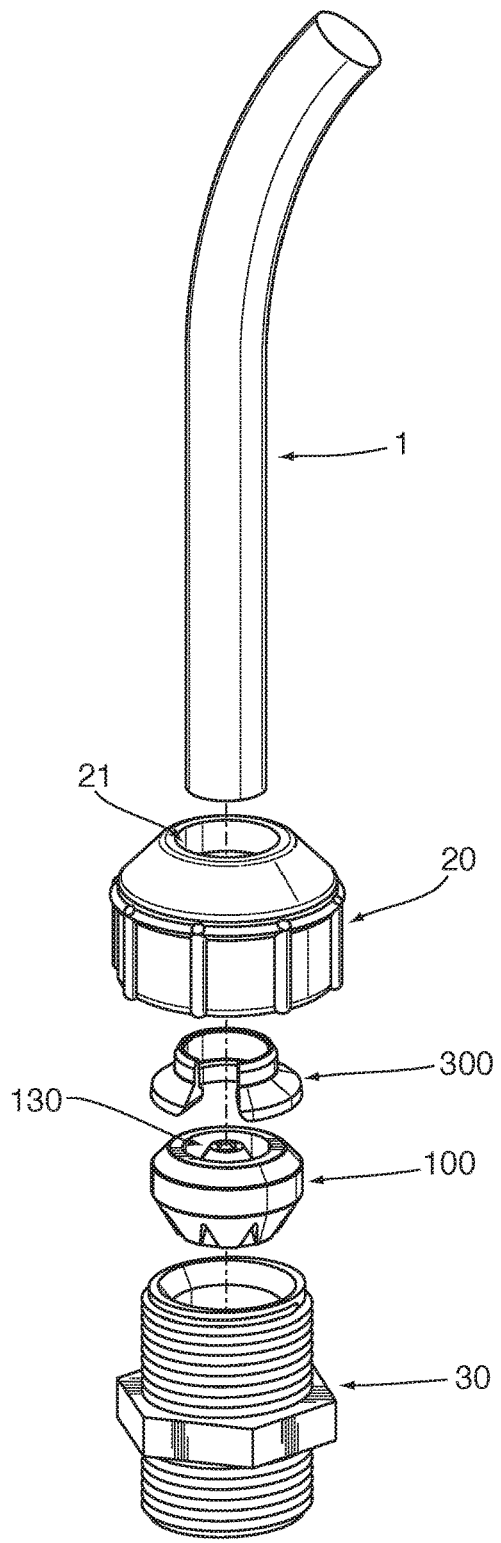
FIG. 9 is an exploded view of the connector shown in FIG. 8 with the cable being inserted.
Figure 10:
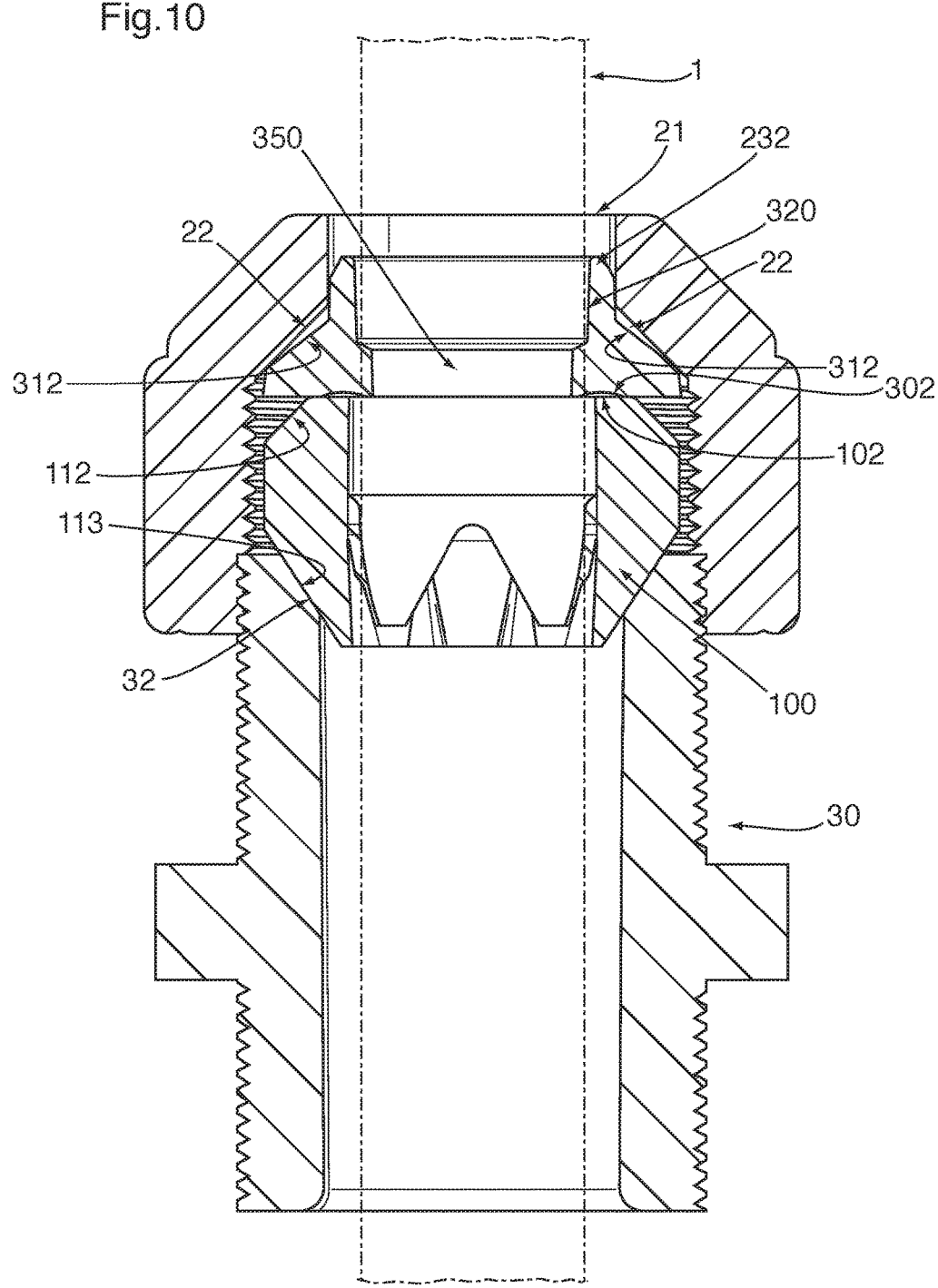
FIG. 10 is a cross-sectional view of the cable connector shown in FIGS. 8 and 9 with the cable inserted therein according to a further preferred embodiment of the present invention.

FIGS. 8, 9 and 10 illustrate a further preferred embodiment of the connector 10 with grommet 100 further comprising an insert 300. The insert 300 may be used in cases where additional frictional force is desired. The insert 300 may also be helpful in cases where cable 1 of different sizes or shapes are used. As illustrated in FIGS. 8, 9 and 10 in a preferred embodiment, the insert 300 may be placed intermediate the connector nut 20 and the grommet 100. As illustrated in FIG. 10, when the cable 1 has been inserted, the internal engagement surface 22 of the connector nut 20 will engage the connector nut engagement surface 312 of the insert 300. The connector nut engagement surface 312 is preferably carried upon a radially expanded section 313 of the insert 300. The radial expanded section 313 is preferably adjacent an inserted portion 320. As illustrated best in FIG. 10, the inserted portion 320 of the insert 300 fits into, or is inserted into, the orifice 21 of the connector nut 20 when the cable connector 10 is assembled. To facilitate this insertion, the inserted portion 320 of the insert 300 preferably has tapered edges 323, shown best in FIGS. 11 and 12.

The angled engagement surface 32 of the connector body 30 will fittingly engage the tapered engagement surface 113 of the grommet 100 as discussed above with respect to the embodiment illustrated in FIGS. 1, 2A and 2B. The receiving end 102 of the grommet 100 will fittingly engage the grommet engagement surface 302 on the insert 300. In this way, the orifice 21 of the connector nut 20, the central opening 321 of the insert 300 and the bore 120 of the grommet will align to form a channel to receive the cable 1.

Figure 11:
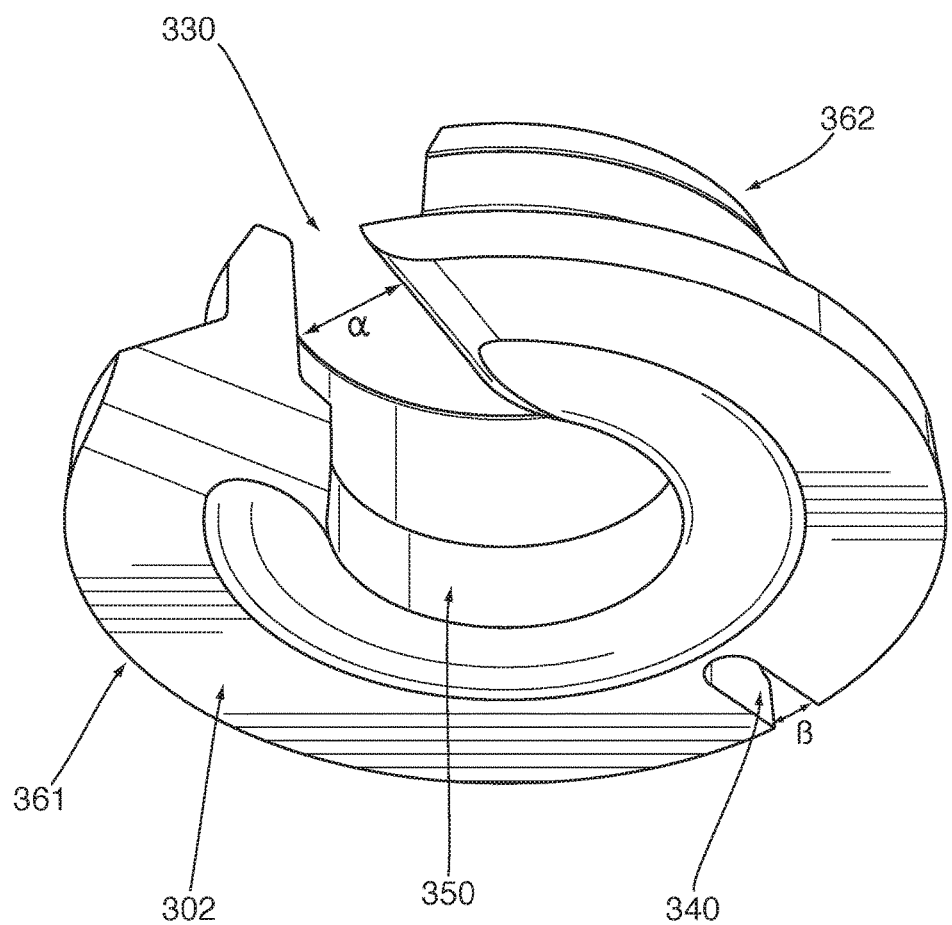
FIG. 11 is a bottom perspective view of an insert according to one embodiment of the present invention.
Figure 12:
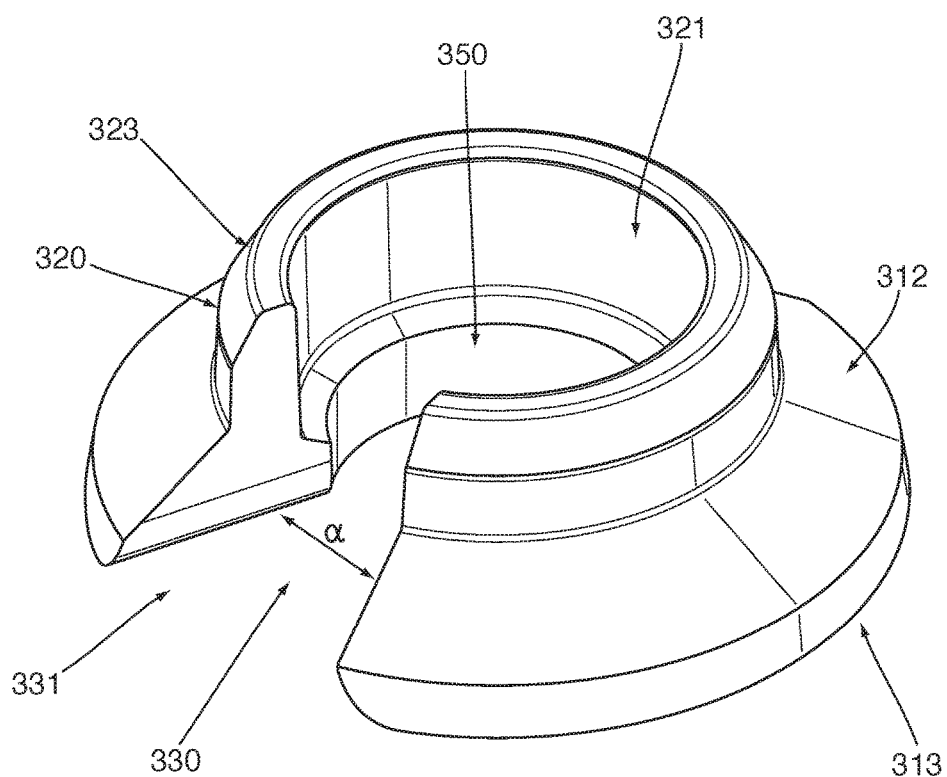
FIG. 12 is top perspective view of an insert shown in FIG. 11 according to one embodiment of the present invention.
Figure 13:
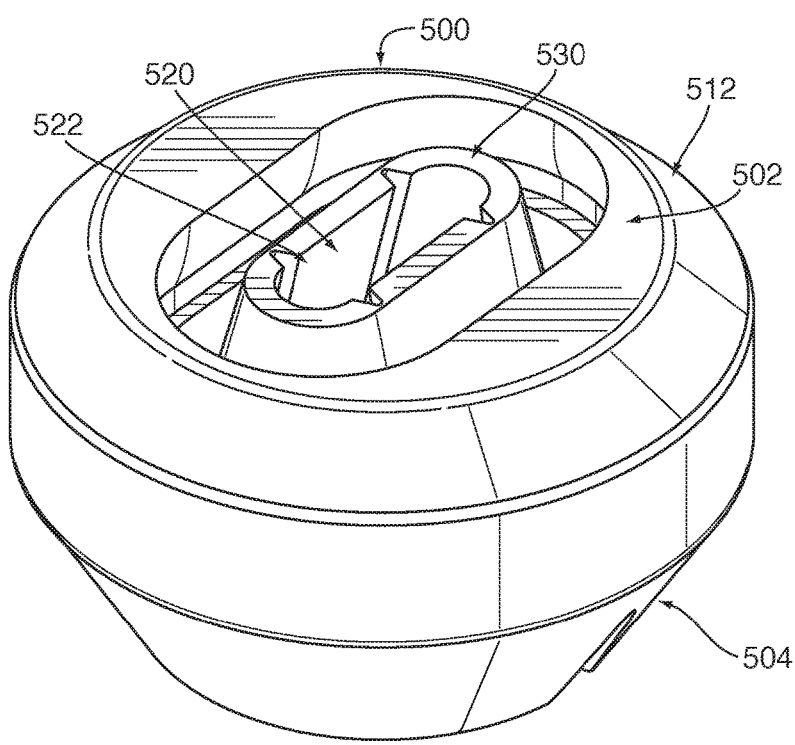
FIG. 13 is a top perspective view of a grommet according to a further embodiment of the present invention with an oval opening.

As illustrated more fully in FIGS. 11 and 12, the insert 300, in a preferred embodiment, has a central opening 321 passing through the inserted portion 320 and the radially expanded section 313, for receiving the cable 1. A gripping surface 350 is located within the central gripping opening 321 for gripping cable 1 when in the inserted position. The central opening 321 may have a decreased internal diameter at the gripping surface 350 and the gripping surface 350 may have an increased friction co-efficient as compared to other parts of the central opening 321. The insert 300 preferably further has a removed radial section (or removed wedged section) 330 which is removed in a radial position along a radial opening arc α providing a radial opening 331. In this way, when the connector 10 is compressed through the relative axial movement of the nut 20 with respect to the connect body 30, the removed radial section 330 and radial opening 331 will decrease, collapsing the central opening 321 about the cable 1 and permitting the gripping surface 350 to grip the cable 1.

Preferably, at least a part, and in a preferred embodiment, all of the gripping surface 350 of the insert 300 is longitudinally coincident with the radially expanded section 313 of the insert 300. In this way, the central opening 321 of the insert 300 may decrease or collapse about the cable 1 thereby permitting the gripping surface 350 to grip the cable 1 once force is applied by the connector internal engagement surface 22 against the connector nut engagement surface 312 by the relative axial movement of the nut 20 with respect to the connector body 30.

To facilitate the movement of the central opening 321 towards the cable 1, permitting the gripping surface 350 to grip the cable 1, the insert 300 also preferably comprises a relief notch 340 shown best in FIG. 11. The relief notch 340 preferably extends along a radial notch arc β. The notch 340 is preferably located in the radially expanded section 313 of the insert 300 and longitudinally axially coincident with the gripping surface 350. More preferably, the notch 340 is diametrically opposed from the removed radial section 330 defining a first part 361 and a second part 362 of the insert 300. The notch 340 facilitates resilient movement of the first part 361 of the insert 300 with respect to the second part 362 to decrease the central opening 321 permitting the gripping surface 350 to grip the cable 1. In this way, when the connector 10 is assembled and there is relative axial movement between the nut 20 with respect to the connector body 30, there will also be relative resilient movement of the first part 361 of the insert 300 towards the second part 362 along the radial opening arc α to decrease the removed radial section 330 and the radial opening 331. As will be appreciated, when there is relative resilient movement of the first part 361 with respect to the second part 362 along the radial opening arc α to decrease the radial opening 331, there will be a corresponding increase in the notch 340 along the notch arc β. In this way, there is relative movement of the first part 361 towards the second part 362 and corresponding movement of the gripping surface 350 within the central opening 321 towards the cable 1.

In operation, the grommet 100 will operate in a manner similar to that as discussed above in the embodiment illustrated in FIGS. 1, 2A and 2B. However, rather than the internal engagement surface 22 of the nut 20 engaging the engagement surface 112 of the grommet 100, the internal engagement surface 22 of the nut 20 will engage the connector nut engagement surface 312 of the insert 300 which is preferably carried upon the radially expanded section 313. In a preferred embodiment, the connector nut engagement surface 312 of the insert 300 is preferably frusto-conically shaped and tapered towards the central opening 321. Similarly, as discussed above, the internal engagement surface 22 of the connector nut 20 is preferably frusto-conically shaped and tapered towards the orifice 21 of the connector nut 20. Thus, the tapered connector nut engagement surface 312 fittingly engages the tapered internal engagement surface 22 of the nut 20 to translate longitudinal axial $L_A$ movement and pressure caused by the relative axial movement of the connector nut 20 and the connector body 30 into axial and radial pressure at the connector nut engagement surface 312 to resiliently move the first part 361 of the insert 300 towards the second part 362 of the insert 300, thereby decreasing the radially removed section 330, collapsing the opening 321 towards the cable 1, and permitting the gripping surface 350 to grip the cable 1. In this way, the friction coefficient of the overall assembled connector 10 comprising the insert 300 will be greater than the assembled connector 10 having the grommet 100 alone. Furthermore, the connector 10 having the insert 300 may better accommodate cable 1 having various sizes and/or various shapes. Nevertheless, it is understood that the connector 10 with the grommet 100 alone can also operate in several circumstances, and the insert 300 may not always be necessary or desirable.

The embodiments described herein allow for the efficient and secure installation of a cable 1 into one or more cable fittings or connectors 10 comprising a grommet 100. In addition, hand tightening of the connector nut 20 to the connector body 30 may provide sufficient pull-out resistance and thereby increases the efficiency of the installation. Furthermore, the above described embodiments and implements eliminate the need for additional components, other than the grommet 100, and in some embodiments an insert 300, within the connector assembly 10. It is also understood that while the operation of the grommet 100 has been described with respect to the particular connector nut 20 and connector body 30 described and illustrated herein, the invention, and in particular grommet 100, is not specifically limited to use with a particular nut 20 and connector body 30 illustrated and described herein, but may be used as other connector nuts 20 and connector bodies 30 of different connector assemblies 10, which nevertheless have similar engagement surfaces, such as the internal engagement surface 22 and the angled engagement surface 32.

It is understood that, while the invention has been described with respect to a cable 1 having a circular cross-section, the invention is not limited in this regard. Rather, the invention would operate with cables 1 having other types of cross-sections, such as oval, triangular, etc. In such cases, it is understood the cable opening 122 and the bore 120, as well as other components of the grommet 100 and/or the cable connector 10 may also have corresponding non-circular cross-sections.

For example, FIGS. 13 to 16 illustrate a further embodiment of a non-circular cross-section grommet, identified generally by reference numeral 500, having in this particular embodiment an oval opening 521. The oval opening 521 is designed to better accommodate cables (not shown) of a corresponding oval cross-section. Other aspects of the non-circular cross-section grommet 500 may be the same or similar as the circular grommet 100 having a circular center opening 122 as discussed above.

In particular, as illustrated in FIGS. 13 to 16, the non-circular cross-section grommet 500 may have a receiving end 502 comprising an engagement surface 512 which is also preferably frusto-conically shaped, similar to the engagement surface 112 of the grommet 100. In general, it is understood that the external aspects of the non-circular cross-section grommet 500 will be similar to the external aspects of the circular grommet 100 to permit easy insertion and/or replacement of the two types of grommets 100, 500, in the connector assembly 10. Furthermore, in a preferred embodiment, the connector assembly 10 may be sold in a kit having the connector nut 20, the connector body 30, at least one circular grommet 100, at least one non-circular grommet 500 (whether with an oval cross-section or a different type of non-circular cross-section, such as triangular etc.) and one or more inserts 300.

The engagement surface 512 of the receiving end 502 of the grommet 500 will fittingly engage the internal engagement surface 22 of the connector nut 20 in a similar manner to that shown above in FIG. 2B with respect to the engagement surface 112 of the grommet 100 fittingly engaging the internal engagement surface 22 of the connector nut 20. Similarly, the tapered engagement surface 513 of the exiting end 504 of the non-circular grommet 500 fittingly engages the angled engagement surface 32 of the connector body 30 in a similar manner as illustrated in FIG. 2B and described above with respect to the tapered engagement surface 113 of the grommet 100. Thus, the engagement surface 512 at the receiving end 502 is preferably a forwardly frusto-conical angled surface, and, the tapered engagement surface 513 at the exiting end 504 of the grommet 500 is preferably a rearwardly tapering frusto-conically angled surface which cooperate with the internal engagement surface 22 of the connector nut 20 and the angled engagement surface 32 of the connector body 30, respectively, to translate longitudinal axial $L_A$ pressure into axial and radial pressure at the receiving end 502 and the exiting end 504 similar to the manner as discussed above with respect to the grommet 100. In particular, by applying axial and radial pressure to the exiting end 504 along the tapered engagement surface 513, the resilient gripping members, identified by reference numeral 550, may be radially compressed about the cable 1.

Figure 14:
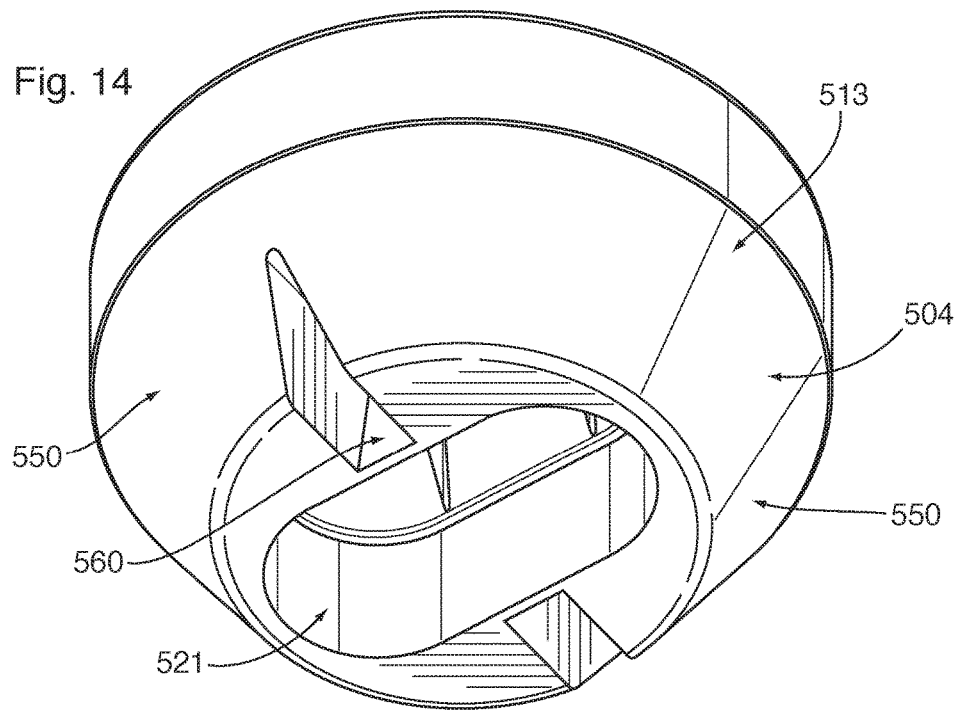
FIG. 14 is a bottom perspective view of the grommet shown in FIG. 13 according to one embodiment of the present invention.
Figure 15:
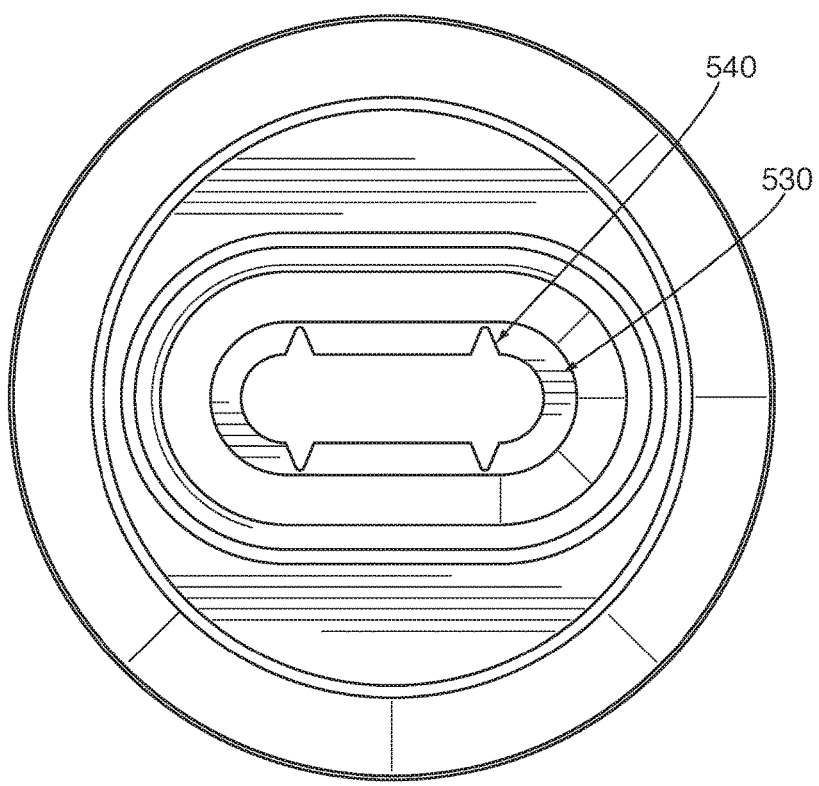
FIG. 15 is a top plan view of the grommet shown in FIG. 13 according to one embodiment of the present invention.
Figure 16:
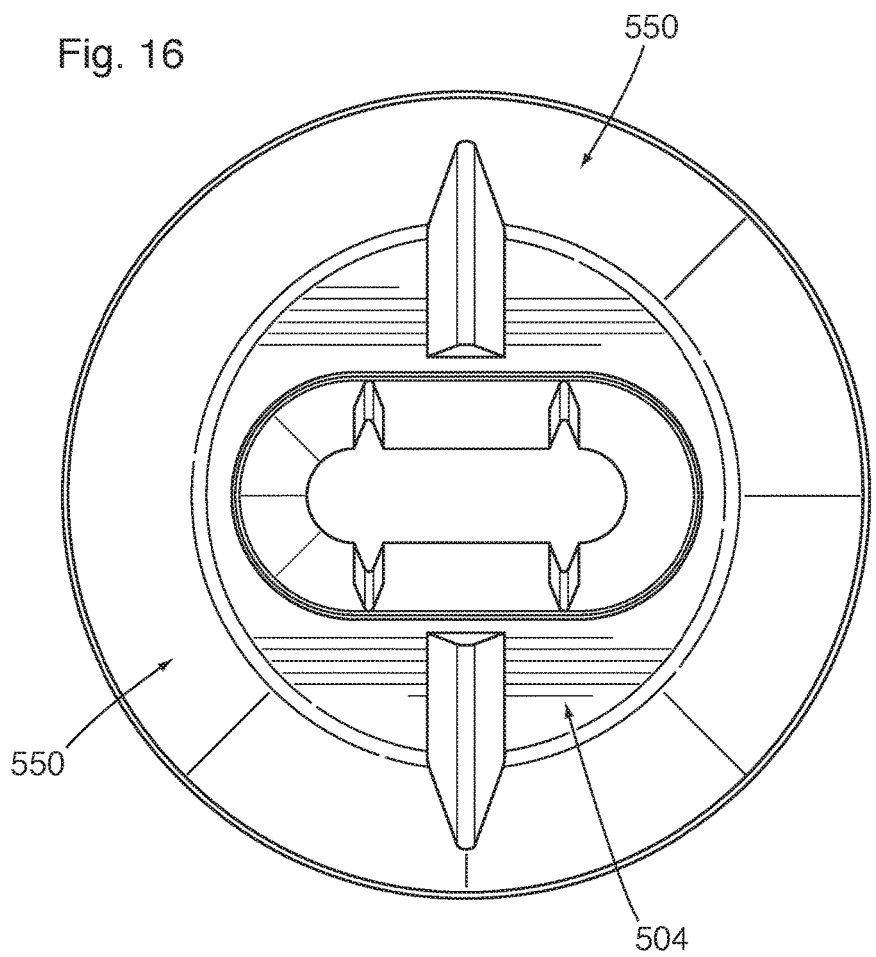
FIG. 16 is a bottom plan view of the grommet shown in FIG. 13 according to one embodiment of the present invention.

As illustrated in FIGS. 14 and 16, the non-circular grommet 500 may have only two gripping members 550. In this way, the cable connector 10 axially and radially compresses the exiting end 504 and the gripping members 550 of the grommet 500 about the non-circular cable (not shown) when the nut 20 is relatively axially moved closer to the connector body 30. Furthermore, it is understood that, as the tapered engagement surface 513 of the resilient gripping members 550, axially and radially compress the gripping members 550 towards the cable (not shown), the resilient foldable membranes, shown generally by reference numeral 560, will fold about the gripping members 550 to form the compressed position of the grommet 500. In addition, the internal engagement surface 22 of the connector nut 20 is in fitting engagement with the engagement surface 512 of the receiving end 502 to axially and radially compresses the receiving end 502, as well as the non-circular bore 520 at the cable opening 522, towards the non-circular cable (not shown).

In addition, when the non-circular cable is inserted into the non-circular grommet 500, the resilient membrane 530 of the grommet 500 will move from the receiving position to an inverted position. Also, if this is the first use of the grommet 500, a control tear (not shown) may occur along the thinner membrane portion 540 shown for instance in FIG. 15.

In other respects, the non-circular grommet 500 will operate in a similar manner to the circular grommet 100. In particular, the external features will be similar between the two grommets 100, 500 to permit interchangeability of grommets 100, 500 in the same connector 10. Furthermore, multiple types of grommets 100, 500 may be sold with a connector nut 20 and connector body 30, and optionally inserts 300, such that the most appropriate grommet 100, 500 could be selected from the kit for use with the nut 20, body 30, and optionally insert 300, because their external features are the same.

It is understood that no element, act or implementation described in this description of the present application should be construed as essential to the invention or critical to the implementation, unless explicitly described as such. Also, where only one item is intended, the term "one" or similar language is used, but it is understood that the article "a" is intended to include one or more items. Furthermore, the word "comprising" is intended to mean including, unless explicitly stated otherwise.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. A grommet for use in a cable fitting, said grommet comprising:
   a body having a bore substantially therethrough, said bore having a cable opening for receiving a cable to be inserted and an exit opening for the cable to exit from the body;
   a resilient membrane located within the bore, said resilient membrane elastically deformable from a receiving position, before the cable is inserted into the bore, to an inverted position, after the cable is inserted into the bore;
   wherein the resilient membrane comprises at least one thinner membrane portion which extends radially towards the bore to facilitate controlled tearing of the resilient membrane.

2. The grommet as defined in claim 1, wherein, in the receiving position, the resilient membrane extends axially forward towards the cable opening, and, in the inverted position, the resilient membrane extends axially away from the cable opening.

3. The grommet as defined in claim 2, wherein, in the receiving position, the resilient membrane is substantially conically shaped having an apex extending forward towards the cable opening.

4. The grommet as defined in claim 3, wherein, in the receiving position, the apex is substantially axially coincident with the cable opening, and, in the inverted position, the apex has been elastically deformed towards the exit opening.

5. The grommet as defined in claim 3, wherein, in the receiving position, the resilient membrane extends across substantially all of the bore and is completely contained within the bore with the apex substantially flush with the cable opening.

6. The grommet as defined in claim 3 wherein the at least one thinner membrane portion extends from the apex towards the bore, and is adapted to create a controlled tear as the cable is first inserted into the bore and the resilient membrane elastically deforms from the receiving position to the inverted position.

7. The grommet as defined in claim 1 further comprising:
a number of resilient gripping members projecting axially from the exit opening; and
wherein, in the inverted position, the resilient membrane is intermediate to the bore and the cable, and, elastically deformed towards the exit opening such that at least a portion of the resilient membrane is axially coincident with at least one of the resilient gripping members and located intermediate the cable and the at least one of the resilient gripping members.

8. A cable fitting comprising a grommet as defined in claim 1.

9. A grommet for use in a cable fitting, said grommet comprising:
a body having a bore substantially therethrough, said bore having a cable opening for receiving a cable to be inserted and an exit opening for the cable to exit from the body;
a resilient membrane located within the bore, said resilient membrane elastically deformable from a receiving position, before the cable is inserted into the bore, to an inverted position, after the cable is inserted into the bore;
wherein the exit opening comprises a number of resilient gripping members projecting axially from the body, and, a number of resilient foldable membranes, each resilient foldable membrane located between two adjacent resilient gripping members, said resilient foldable membranes folding between the resilient gripping members when the resilient gripping members are radially compressed.

10. A cable fitting comprising a grommet as defined in claim 9.

11. A grommet as defined in claim 9, wherein the resilient membrane further comprises at least one thinner membrane portion extending radially towards the bore, said at least one thinner membrane adapted to create a controlled tear as the cable is first inserted into the bore and the resilient membrane elastically deforms from the receiving position to the inverted position.

12. A cable connector comprising:
a connector nut having an internal engagement surface;
a connector body axially movable relative to the connector nut and having an angled engagement surface;
a grommet contained within the connector nut and the connector body, said grommet having a bore substantially therethrough, said bore having a cable opening for receiving a cable at a receiving end and an exit opening for the cable to exit at an exiting end, and, resilient gripping members projecting axially from the grommet at the exit opening, an external portion of the resilient gripping members fittingly engaging the angled engagement surface of the connector body;
a resilient membrane located within the bore, said resilient membrane elastically deformable from a receiving position, before the cable is inserted into the bore, to an inverted position, after the cable is inserted into the bore;
wherein axially moving the connector nut towards the connector body causes the internal engagement surface and the angled engagement surface to apply axial and radial pressure in the grommet; and
wherein axial movement of the connector nut towards the connector body causes the angled engagement surface of the connector body to radially compress the resilient gripping members towards the cable.

13. The cable connector as defined in claim 12, further comprising at least one resilient foldable membrane extending between adjacent resilient gripping members, wherein the at least one resilient foldable membrane folds between the adjacent resilient gripping members when the resilient gripping members are radially compressed toward the cable.

14. The cable connector as defined in claim 13, wherein said grommet has an engagement surface at the receiving end for fittingly engaging the internal engagement surface of the connector nut, and, a tapered engagement surface at the exiting end for engaging the angled engagement surface of the connector body, said tapered engagement surface comprising the external portion of the resilient gripping members such that axially moving the connector nut towards the connector body causes the internal engagement surface to apply axial and radial pressure on the engagement surface of the receiving end and the angled engagement surface of the connector body to apply axial and radial pressure to the tapered engagement surface of the exiting end causing the gripping members to radially compress about the cable.

15. The cable connector as defined in claim 13 wherein, in the inverted position, the resilient membrane is intermediate to the bore and the cable, and, elastically deformed towards the exit opening such that at least a portion of the resilient membrane is axially coincident with at least one of said resilient foldable membranes located between adjacent resilient gripping members and located intermediate the cable and the at least one of said resilient foldable membranes.

16. The cable connector as defined in claim 12, wherein, in the receiving position, the resilient membrane extends axially forward towards the cable opening, and, said resilient membrane is axially displaced during insertion of the cable from the receiving position to the inverted position, which is an inverted orientation with respect to the receiving position and is oriented away from the cable opening.

17. The cable connector as defined in claim 12 further comprising:
an insert contained within the connector nut and the connector body and located intermediate the connector nut and grommet, said insert having a central opening for receiving the cable, a gripping surface located within the central opening for gripping the cable, and a removed radial section facilitating movement of the central opening towards the cable to permit the gripping surface to grip the cable.

18. The cable connector as defined in claim 17, wherein the insert further includes a radially expanded section substantially longitudinally axially coincident with the gripping surface, said radially expanded section carrying a connector nut engagement surface for fittingly engaging the internal engagement surface of the connector nut;

wherein axial movement of the connector nut towards the connector both causes the internal engagement surface of the connector nut to apply axial and radial pressure on the connector nut engagement surface decreasing the removed radial section and facilitating movement of the central opening towards the cable to permit the gripping surface to grip the cable.

19. The cable connector as defined in claim 18, wherein the insert further includes a relief notch located in the radially expanded section and substantially longitudinally axially coincident with the gripping surface, said relief notch increasing along a relief are as the removed radial section decreases along a corresponding radial arc to facilitate movement of the central opening towards the cable permitting the gripping surface to grip the cable;
   wherein the relief notch of the insert is diametrically opposed from the removed radial section defining a first part and a second part of the insert; and
   wherein axial movement of the connector nut towards the connector body causes resilient relative movement of the first part towards the second part along the radial arc to collapse the central opening permitting the gripping surface to grip the cable.

20. A cable connector comprising:
   a connector nut having an internal engagement surface;
   a connector body axially movable relative to the connector nut and having an angled engagement surface;
   a grommet contained within the connector nut and the connector body, said grommet having a bore substantially therethrough, said bore having a cable opening for receiving a cable at a receiving end and an exit opening for the cable to exit at an exiting end, and,
   a resilient membrane located within the bore, said resilient membrane elastically deformable from a receiving position, before the cable is inserted into the bore, to an inverted position, after the cable is inserted into the bore;
   an insert contained within the connector nut and the connector body and located intermediate the connector nut and grommet, said insert having a central opening for receiving the cable, a gripping surface located within the central opening for gripping the cable, and a removed radial section facilitating movement of the central opening towards the cable to permit the gripping surface to grip the cable; and
   wherein axially moving the connector nut towards the connector body causes the internal engagement surface and the angled engagement surface to apply axial and radial pressure in the grommet;
   wherein the insert further includes a radially expanded section substantially longitudinally axially coincident with the gripping surface, said radially expanded section carrying a connector nut engagement surface for fittingly engaging the internal engagement surface of the connector nut;
   wherein axial movement of the connector nut towards the connector body causes the internal engagement surface of the connector nut to apply axial and radial pressure on the connector nut engagement surface decreasing the removed radial section and facilitating movement of the central opening towards the cable to permit the gripping surface to grip the cable;
   wherein the insert further includes a relief notch located in the radially expanded section and substantially longitudinally axially coincident with the gripping surface, said relief notch increasing along a relief arc as the removed radial section decreases along a corresponding radial arc to facilitate movement of the central opening towards the cable permitting the gripping surface to grip the cable, said relief notch of the insert being diametrically opposed from the removed radial section defining a first part and a second part of the insert;
   wherein axial movement of the connector nut towards the connector body causes resilient relative movement of the first part towards the second part along the radial arc to collapse the central opening permitting the gripping surface to grip the cable; and
   wherein the insert comprises an inserted portion adjacent the radially expanded portion, said inserted portion fitting into an orifice of the nut to orient the insert within the cable connector.

21. The cable connector as defined in claim 20, wherein said grommet comprises a tapered engagement surface at the exiting end for engaging the angled engagement surface of the connector body and the insert comprises a grommet engagement surface on the radially expanded section for engaging the grommet.

22. A kit comprising a cable connector as defined in claim 21, with at least one connector nut, at least one connector body, at least one insert, and at least one grommet having a circular opening and at least one grommet having a non-circular opening.

* * * * *